Oct. 24, 1967  B. RAPSON  3,349,160
APPARATUS FOR PASSING ELECTRIC CURRENT THROUGH LIQUIDS
Filed July 13, 1964
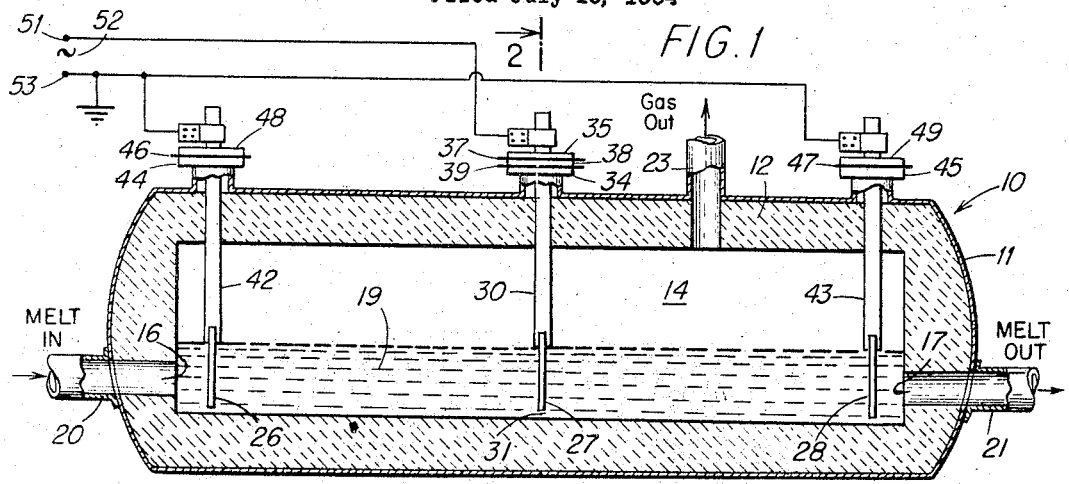
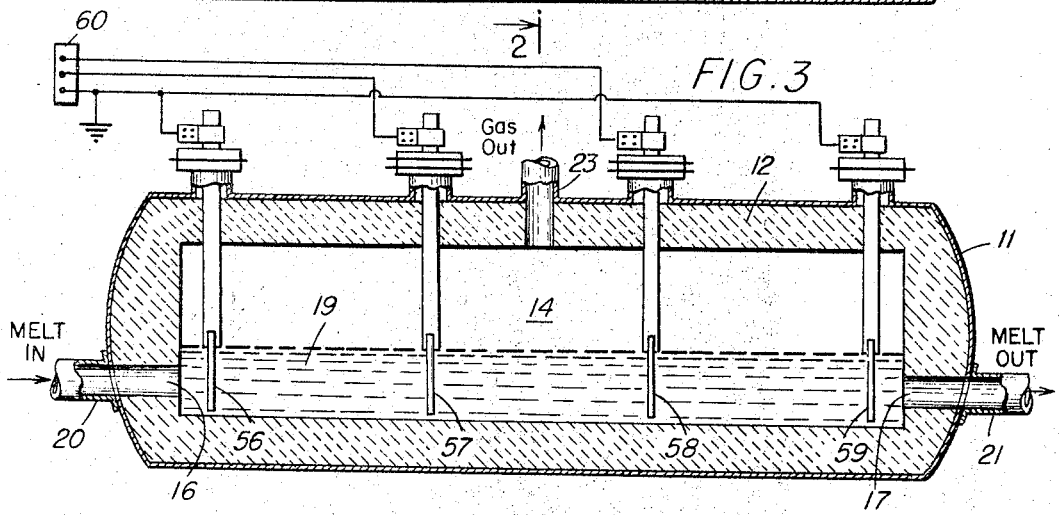
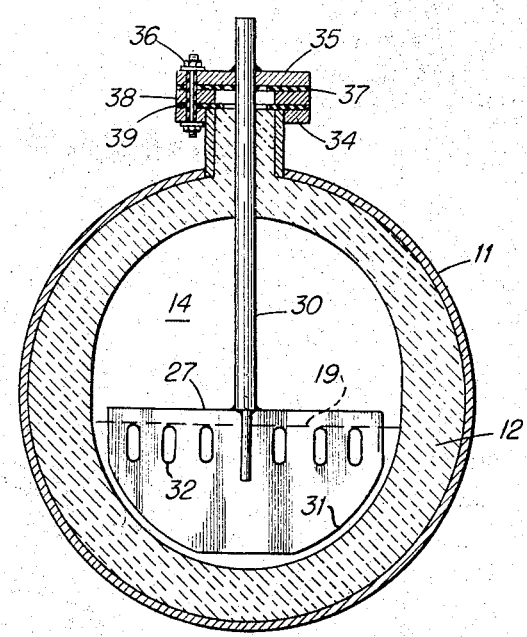
INVENTOR.
Bryan Rapson
BY
Robert S. Dunham
Attorney United States Patent Office 3,349,160
Patented Oct. 24, 1967

3,349,160
APPARATUS FOR PASSING ELECTRIC
CURRENT THROUGH LIQUIDS
Bryan Rapson, Arvida, Quebec, Canada, assignor to
Aluminium Laboratories Limited, Montreal, Quebec, Canada, a corporation of Canada
Filed July 13, 1964, Ser. No. 382,124
8 Claims. (Cl. 13—23)

ABSTRACT OF THE DISCLOSURE

A flow of molten salt advancing through an electrically insulated confined chamber from a metal inlet conduit to a metal outlet conduit is electrically heated by disposing a plurality of electrodes in spaced relation along the path of flow within the confined chamber. These electrodes include first and second grounded electrodes respectively positioned adjacent the inlet and outlet, and at least one other electrode interposed between the first and second electrodes and connected to an ungrounded terminal of an alternating current supply which also has a grounded terminal, so that alternating current passes through the molten salt between the electrodes in a direction coaxial with the path of molten salt flow. The electrodes may be planar metal plates extending transversely of the flow direction and may be so spaced that the interelectrode resistances in the flow are substantially equal to each other.

This invention relates to procedures and apparatus for passing an electric current through a flow of liquid, to heat the liquid or to effect other electrolytic treatment thereof. In one specific aspect the invention is particularly directed to procedures and apparatus for elevating the temperature of a flow of molten salt in a confined region by internal resistance heating to volatilize a constituent of the salt bath.

An important field of application for the invention, in such aspect, is in the purification and recirculation of aluminum chloride gas for use in the so-called aluminum subhalide distillation process. In this connection, it may be explained that the production of purified aluminum metal from crude aluminum-containing alloys by subhalide (e.g., monochloride) distillation, as disclosed for example in United States Patent No. 2,937,082, involves reaction of the alloy with aluminum chloride (here and elsewhere herein meaning normal aluminum chloride, i.e. trichloride, $AlCl_3$) in gaseous state. Thus, aluminum chloride gas is introduced to a heated mass of the alloy in a suitable converter or furnace, preferably as a continuous flow of gas. In a later stage of the distillation system, aluminum chloride ($AlCl_3$) gas is discharged; for the sake of convenience and economy of operation, this latter gas is, in accordance with conventionally proposed procedures, recycled to the converter for reuse therein. However, the aluminum chloride gas as discharged from the distillation system contains impurities produced in the system, e.g. in gaseous form, such as hydrogen, which tend to build up as the gas is repeatedly recycled, impairing the efficacy of the distillation process. It is therefore desirable to treat the gas, or at least a proportion of it, before returning it to the converter, to remove these impurities therefrom and thus to prevent or control the accumulation of deleterious contaminants in the gas.

A suitable method for effecting purification of such aluminum chloride gas is disclosed in the copending application of Ethan A. Hollingshead and Norman W. F. Phillips, Serial No. 181,123, filed March 20, 1962, entitled "Procedure and Apparatus for Subhalide Refining of Aluminum," and now United States Patent No. 3,235,376, assigned to the same assignee as the present application. This purification method involves the establishment of a molten mixture of aluminum chloride and other salt or salts (preferably sodium chloride) at an elevated temperature. Aluminum chloride gas as delivered from the distillation system is introduced to and absorbed in the molten salt mixture in an absorber. The mixture, thus enriched in aluminum chloride, is then passed to an evaporator, where it is heated to re-evolve a proportion of the contained aluminum chloride as a gas, in a quantity which may desirably be approximately equal to the amount of aluminum chloride gas added to the mixture in the absorber.

These steps of absorption and re-evaporation of the aluminum chloride gas effect removal of undesired impurities so that the gas evolved in the evaporator is in suitable condition to be re-introduced to the subhalide distillation system. After such liberation of aluminum chloride gas, the molten mixture, now reduced in aluminum chloride content, is cooled and recycled to the absorber to treat additional quantities of impure aluminum chloride gas delivered from the aluminum production system, i.e. for purification and re-evaporation, as before. In this way, contaminated aluminum chloride gas discharged from the subhalide distillation system is purified and returned for reuse in the distillation system in a substantially continuous operation. Indeed apart from cleaning or purification, the above process when applied to the entirety of the recycled aluminum chloride is advantageous in some cases for its function, in effect, as a mode of recirculating the gas back to the converter, e.g. in lieu of mechanical gas-advancing means.

The evaporator structure of the above-described purification system preferably comprises a metal (e.g. steel) shell lined internally with refractory brick and defining a confined region or chamber through which the molten salt is advanced in continuous flow, from an inlet passage on one side of the chamber to an outlet passage on the opposite side. The melt is preferably conveyed to and from the evaporator in unlined steel pipes. Heating of the molten salt is effected in the chamber by passage of alternating electric current through the salt, preferably in a direction parallel to the direction of the salt flow, between electrodes immersed therein; for simplicity of arrangement, single-phase alternating current is conveniently employed, although three-phase heating may also be used. The molten salt has an average resistivity of about one ohm-cm. at the usual operating temperatures of the evaporator, e.g. between about 400° and about 500° C.

The refractory lining of the steel evaporator shell insulates the shell electrically as well as thermally from the molten salt flow in the chamber, and thus prevents passage of current from the melt into the shell, which has a much lower resistance than the molten salt; in addition, the shell is water-cooled externally to freeze any molten salt that penetrates the lining before such salt can pass through the lining to make electrical contact with the shell. However, when a conventional two-electrode arrangement is used in the evaporator (i.e. employing a pair of electrodes respectively disposed adjacent the inlet and outlet conduits to provide passage of current in the desired direction), current is conducted from the two electrodes through the melt to the unlined steel inlet and outlet pipes respectively, causing a short-circuit between the pipes, e.g. through the steel evaporator shell or through other external metallic structure affording a current path between the pipes, unless an electrical break such as a cascade system is provided in the entering or exiting melt flow to interrupt the current path between one of the electrodes and the pipe adjacent thereto. The provision of such electrical break involves substantial inconvenience and expense requiring special and complex structures which occupy considerable space.

Moreover, in the two-electrode system insulation of the electrodes from the evaporator shell is difficult, because to effect the desired current flow through the melt the voltages on the electrodes must ordinarily be high; and operating flexibility is limited, in that different sectors of the flow in the evaporator cannot be treated with different power inputs or current densities, as is sometimes desirable.

Structures of the type exemplified by the above-described evaporator possess important advantages, especially with respect to simplicity and economy of construction, for various operations involving heating or other electrolytic treatment of flows of liquid by passage of electric current therethrough. That is to say, an internally insulated steel vessel is a convenient and economical form of structure in which to effect passage of the current through the flowing liquid; and it is advantageously simple and economical to convey the liquid to and from the evaporator in unlined steel pipes. In addition, provision of current flow in a direction parallel to the direction of fluid flow is advantageous for maintenance of uniform current density across the current path, especially when the flowing liquid undergoes progressive change in resistivity (due to change in composition or temperature) under the influence of the current. However, as in the specific instance described above, the advantages of such structures and arrangements have heretofore been considerably offset by the necessity of creating an electrical break in the inlet or outlet flow to prevent short-circuiting, as well as by the aforementioned problems of electrode insulation and limitations in operating flexibility.

An object of the present invention is to provide structurally simple, convenient, and economical apparatus for effecting passage of electric current through a flowing liquid in a direction coaxial with the direction of liquid flow, wherein short-circuiting is prevented in a manner that obviates the necessity of providing an electrical break in the inlet or outlet flow of the liquid. Another object is to provide a method of passing an electric current through a flowing liquid along a path coaxial with the path of liquid flow, in structure of the type described above, wherein short-circuiting is prevented in an advantageously simple and convenient manner. A further object is to provide such procedures and apparatus in which improved operating flexibility is afforded, and in which the electrode voltages required to effect a given desired current flow are very substantially reduced (as compared to conventional two-electrode systems) thereby simplifying the problem of electrode insulation. Still another object is to provide such procedures and apparatus adapted to heat a flow of molten salt to evaporate a constituent thereof, e.g. as in the aforementioned system for purifying aluminum chloride gas.

Further objects and advantages of the invention will be apparent from the detailed description hereinbelow set forth, together with the accompanying drawings, wherein:

FIG. 1 is a sectional elevational view of an exemplary embodiment of the invention adapted to effect evaporation of aluminum chloride gas from a molten salt mixture;

FIG. 2 is a sectional view taken along the line 2—2 of FIG. 1; and

FIG. 3 is a sectional elevational view of another embodiment of the invention also adapted for use as an aluminum chloride evaporator.

Referring first to FIGS. 1–2, the apparatus of the invention in the form there shown comprises an evaporator 10 adapted to be used in an aluminum chloride purification system as described above, wherein a molten salt mixture, e.g. a molten mixture of sodium chloride and aluminum chloride, is continuously cycled between an absorber (not shown) and the evaporator. In the absorber, aluminum chloride gas is absorbed into the molten mixture from a contaminated aluminum chloride gas flow as delivered from an aluminum subhalide distillation system; in the evaporator, the molten mixture is heated as hereinafter further explained to re-evolve a proportion of the contained aluminum chloride as purified gas. The latter gas is returned from the evaporator to the subhalide distillation system, and the molten salt mixture is withdrawn from the evaporator, cooled by suitable means (not shown), and recycled to the absorber to absorb further quantities of aluminum chloride gas.

The structure of the evaporator 10 includes a steel outer shell 11 and an internal lining 12 of refractory brick, e.g. high-purity dense alumina brick, arranged to provide an elongated, axially horizontal, gas-tight insulated chamber 14 of generally cylindrical configuration. Molten salt is introduced to this chamber through an inlet passage 16 at the lower part of one end of the chamber, and is withdrawn from the chamber through an outlet passage 17 at the lower part of the opposite end of the chamber, so that the path of salt flow through the chamber is parallel to the long axis of the chamber. In operation, the chamber is ordinarily maintained partially filled with a continuous flow of molten salt 19, i.e. to a level above the openings 16 and 17. An unlined steel conduit 20, secured at its end to the evaporator shell 11 and communicating with the inlet passage 16, delivers the molten salt to the chamber; a second unlined steel conduit 21, also secured at its end to the shell 11 and communicating with the outlet passage 17, carries the salt away from the evaporator. Gas (i.e. aluminum chloride) is withdrawn from the evaporator through a conduit 23 which communicates with the top of the chamber 14. In addition, conventional means such as a water jacket (not shown) may be provided for cooling the evaporator externally.

In accordance with the invention, three electrodes respectively designated 26, 27 and 28 are disposed in the chamber 14 in spaced relation along the path of salt flow. The outer electrodes 26 and 28, respectively positioned upstream and downstream of the middle electrode 27, are respectively adjacent to the inlet and outlet passages 16 and 17. Each of these electrodes comprises a semicircular planar steel plate, of diameter slightly smaller than the internal diameter of the chamber 14, suspended from the top of the evaporator by a stainless steel rod to which the electrode is welded. Thus, as shown in FIG. 2, the planar electrode plate 27 is suspended by a rod 30 so as to perpendicularly intersect the path of salt flow, with its arcuate edge directed downwardly and positioned in concentric, closely adjacent but spaced relation to the curved wall of the chamber 14; the molten salt flows through the space 31 between the chamber wall and the electrode (the edge of which is trimmed at the bottom and sides to enlarge the space 31 at these localities), as well as through a plurality of apertures 32 in the electrode plate. Electrodes 26 and 28 are arranged in the same manner.

The rod 30 of the electrode 27 is secured by an insulated mounting to a flange 34, which is integral with the evaporator shell 11, at the top of the evaporator; specifically, as shown, the rod is welded to a plate 35, which is secured to the flange 34 by insulated bolts 36 and separated from the flange by a first insulating gasket 37, a ring 38, and a second insulating gasket 39, to insulate the rod electrically from the shell 11 and to provide a gas-tight seal preventing escape of aluminum chloride from the chamber 14 through the electrode mounting. The corresponding rods 42 and 43 of the electrodes 26 and 28 are similarly secured to flanges 44 and 45, respectively, but because of the potential at which these latter electrodes are maintained (as hereinafter explained) the arrangements for insulating them from the shell may be simplified, i.e. mounting plates 46 and 47 respectively welded to the rods 42 and 43 may be separated from the flanges 44 and 45 by single gaskets 48 and 49. All three of the electrode rods extend above the respective mounting flanges to enable external electrical connections to be made to the electrodes.

As thus mounted, the electrode plates 26, 27 and 28, immersed in the salt flow 19 in spaced relation along the path of flow with their plane faces parallel to each other and extending transversely across the area of the chamber 14 occupied by the flow 19, are arranged to effect passage of electric current through the molten salt in the chamber 14 in a direction coaxial with the path of salt flow. The coaxial orientation of the current path and the salt flow path is important for the heating operation, enabling the total current path to be of extended length, and also affording substantially uniform current density across the entire cross-sectional area of the current path at any given point in the path notwithstanding that the composition and temperature (and hence the electrical resistivity) of the salt change progressively as it passes through the chamber 14.

Further in accordance with the invention, the outer electrodes 26 and 28, respectively adjacent to the inlet and outlet conduits 20 and 21, are connected together and grounded; the middle electrode 27 is connected to the underground terminal 51 of a suitable conventional single-phase alternating current power supply 52 which also has a grounded terminal 53. Alternating current then passes through the salt flow 19 between the electrodes 27 and 26, and also between the electrodes 27 and 28.

Heating of molten salt in the evaporator 10 to evaporate aluminum chloride is accordingly accomplished by advancing the molten salt through the chamber 14, e.g. in continuous flow, while passing alternating current through the flow between the electrodes as described above. The aluminum chloride gas evolved is returned to the subhalide distillation system through the conduit 23.

As may now be readily understood, the arrangement of electrodes described above effects passage of current through the molten salt along a path coaxial with the direction of salt flow, in a manner obviating the necessity of providing an electrical break in the inlet or outlet flow to prevent short-circuiting. Since the outer electrodes 26 and 28, respectively adjacent to the conduits 20 and 21, are at ground potential, there is no difference of potential between these latter electrodes and the respectively adjacent conduits or the shell; consequently current does not flow through the molten salt either between the conduit 20 and electrode 26 or between the conduit 21 and electrode 28, and hence no short-circuit can develop through the conduits and the evaporator shell (or other external structure providing a current path between the conduits). That is to say, avoidance of short-circuiting is achieved through the provision of an array of electrodes including a middle electrode connected to the ungrounded terminal of the power supply and a pair of outer electrodes which are respectively positioned adjacent to the inlet and outlet conduits, connected together, and maintained at such potential that no difference of potential exists between these latter electrodes and the conduits.

As a further important advantage of the invention, the voltage on the middle electrode 27 of the foregoing apparatus may be as low as one-half the voltage on one electrode of a conventional two-electrode system (assuming the other electrode is grounded), for passage of a given current through the melt over a current path of given total length (i.e. distance between electrodes 26 and 28). This very substantial reduction in electrode voltage considerably simplifies the problem of insulating the electrode 27 from the evaporator shell. Insulation of the electrodes 26 and 28 involves no difficulty because these electrodes are at ground potential.

The aforementionel reduction in voltage is due to the fact that, in the evaporator of FIGS. 1–2, the current path in the region or compartment between electrodes 26 and 27 is effectively connected in parallel with the current path in the compartment between electrodes 27 and 28. Because of this arrangement, the voltages across the two compartments are equal, and the total voltage on the middle electrode 27 is equal to the voltage across one compartment. Since the resistance of the melt is proportional to the length of the current path therethrough, the resistance in the region or compartment between electrodes 26 and 27 may be made equal to the resistance in the compartment between electrodes 27 and 28 by appropriately positioning the electrode 27 relative to the two outer electrodes; in such case the resistance in each compartment is half as large as the resistance of the melt over the total distance between electrodes 26 and 28. The voltage on the electrode 27 required to pass a given current through both compartments (which is equal to the voltage required to pass the current through one compartment) is then, correspondingly, half that required to pass the same current between two electrodes over a path of length equal to the latter total distance.

The requisite condition for equal resistance in the two compartments of the evaporator of FIGS. 1–2 is defined by the relation $$AR = \rho_1 L_1 = \rho_2 L_2 \quad (1)$$

wherein $L_1$ is the length of the first compartment (i.e. the distance between electrodes 26 and 27);

$\rho_1$ is the average resistivity of the melt in the first compartment;

$L_2$ is the length of the second compartment (i.e. the distance between electrodes 27 and 28);

$\rho_2$ is the average resistivity of the melt in the second compartment;

A is the vertical cross-sectional area of the melt flow 19; and

R is the electrical resistance in each compartment. Accordingly, if the average resistivity of the melt is the same in the two compartments, the resistance in the first compartment may be made equal to that in the second by positioning the electrode 27 halfway between the outer electrodes 26 and 28. To provide equal resistance in the two compartments when the average resistivity of the melt in one compartment differs from that in the other (as is ordinarily the case, due to the progressive change in temperature and depletion of the aluminum chloride content of the melt), the electrodes are not equally spaced but are instead so positioned that the lengths of the two compartments are inversely proportional to the average resistivities therein, i.e. in accordance with the relation $$\frac{L_1}{L_2} = \frac{\rho_2}{\rho_1} \quad (2)$$

as will be clear from Equation 1 above.

When the voltage is thus halved, the current that must be carried by the middle electrode 27 of the present apparatus must be twice as large as that carried by either electrode of a corresponding two-electrode system, requiring larger leads to the middle electrode to accommodate this larger current. However, for a given power input, the current density of the melt in each compartment is substantially equal to that in the two-electrode system; and, similarly, the current density on the surface of each end electrode and also on each surface of the middle electrode is essentially the same as that on the electrode surfaces of the two-electrode system, because the current entering the melt from the middle electrode 27 is approximately equally divided between the two surfaces of the latter electrode. Hence the surface area of the middle electrode need be no larger than that of either of the two end electrodes.

The electrode arrangement of the present invention also enables greater operating flexibility than the two-electrode system. When the resistances in the two compartments in the evaporator of FIGS. 1–2 are equal, as described above, equal power inputs and current densities are provided for the two compartments, affording the same operating conditions as in a two-electrode system having a current path length equal to the total distance between electrodes 26 and 28. Alternatively, the power input or current density may be made higher in one compartment than in the other (as is sometimes desirable because of changing melt composition and temperature) by appropriate spacing of the electrodes. For example, if it is desired that the power input and current density in the first compartment be twice as large as in the second compartment, the resistance in the first compartment must be half as large as the resistance in the second compartment, since the voltages across the two compartments are always equal. Such resistances are provided by spacing the electrodes 26, 27 and 28 to provide relative lengths $L_1$ and $L_2$ for the two compartments satisfying the relation $$\frac{L_1}{L_2} = 0.5 \frac{\rho_2}{\rho_1} \qquad (3)$$

since the resistance in each compartment is directly proportional to the product of the average resistivity $\rho$ of the melt therein and the compartment length.

Referring now to FIG. 3, there is shown an alternative embodiment of the invention, also adapted for use as an evaporator in the aluminum chloride purification system referred to above, but arranged to provide three-phase alternating current heating of the molten salt. The structure of the evaporator of FIG. 3 is generally similar to that of the evaporator 10 of FIGS. 1–2, including a steel shell 11 lined with refractory brick 12 and defining a generally cylindrical heating chamber 14 which is partially filled with molten salt 19 advancing from an inlet passage 16 to an outlet passage 17 along a path of flow parallel to the chamber axis. Unlined steel inlet and outlet conduits 20 and 21 secured to the shell 11, and a gas outlet conduit 23, are also provided as before.

To effect three-phase heating in the evaporator of FIG. 3, four electrodes respectively designated 56, 57, 58 and 59 are positioned within the evaporator chamber in spaced relation to each other along the path of salt flow for passage of current through the molten salt in a direction coaxial with the salt flow path. These electrodes are identical in construction and mounting to the electrodes 26, 27 and 28 of the evaporator of FIGS. 1–2, and thus constitute an array of spaced, parallel, planar steel plates immersed in the flow and perpendicularly intersecting the flow path. The outer electrodes, 56 and 59, are respectively adjacent to the inlet and outlet passages 16 and 17 and are secured to the evaporator shell in the same manner as the electrodes 26 and 28 of FIGS. 1–2. The inner electrodes 57 and 58, disposed between the outer electrodes, are secured to the evaporator shell in the same manner as the electrode 27 of FIGS. 1–2 so as to be insulated electrically from the shell.

In this electrode arrangement, the outer electrodes 56 and 59 are connected together and grounded; hence no difference of potential exists between these latter electrodes and the respectively adjacent inlet and outlet conduits 20 and 21. Short-circuiting through the latter conduits and the evaporator shell is thereby prevented, as in the evaporator of FIGS. 1–2, without the necessity of providing an electrical break in the inlet or outlet salt flow. The inner electrodes 57 and 58 are separately connected to the two ungrounded terminals of a suitable three-phase alternating current power supply 60, which also has a grounded terminal. Three-phase heating of the molten salt, to evolve aluminum chloride gas for discharge through the conduit 23, is accordingly effected in the evaporator of FIG. 3 by advancing the salt through the chamber 14 while passing alternating current through the salt flow between the four electrodes immersed therein.

With three-phase heating using four electrodes as shown in FIG. 3, the phase voltage (which is the voltage on each of the inner electrodes 57 and 58) is only one-third the voltage on one electrode of a two electrode system (assuming the other electrode is grounded), and only two-thirds the voltage on the middle electrode 27 of the three-electrode system of FIGS. 1–2, for passage of a given current through the molten salt over a current path of given total length (i.e. between electrodes 56 and 59). This relatively low voltage requirement facilitates the insulation of the electrodes from the evaporator shell. The evaporator arrangement of FIG. 3 also affords advantageous operating flexibility, in that different power inputs and current densities may be provided for the three inter-electrode compartments of the evaporator by appropriate spacing of the electrodes.

By way of further and more specific illustration of the procedures and apparatus of the present invention, an evaporator of the type shown in FIGS. 1–2 was constructed having a heating chamber 22.25 feet long and 4 feet in diameter with three electrodes each comprising a 1 inch thick semicircular steel plate 3.83 feet in diameter. The minimum molten salt level in the heating chamber was six inches below the centerline of the evaporator. The three electrodes were so spaced that the first interelectrode compartment (between the electrode adjacent the molten salt inlet and the middle electrode) was 9 feet, 10.25 inches in length, and the second interelectrode compartment was 10 feet, 10.75 inches in length.

This evaporator was designed to produce 9,100 lb./hr. of aluminum chloride gas at a temperature of 450° C. and a pressure of 1150 mm. of mercury (absolute), by evaporation from a molten mixture of aluminum chloride and sodium chloride entering the evaporator at a rate of 126,600 lb./hr. and having an inlet concentration of 58.5 mol percent aluminum chloride, with an inlet temperature of 414° C., and at a gas pressure of 1150 mm. of mercury (absolute). In such operation, the molten salt mixture was discharged from the evaporator at a rate of 117,500 lb./hr. and had an outlet concentration of 56 mol percent aluminum chloride with an outlet temperature of 490° C. and a gas pressure of 1150 mm. of mercury (absolute). The average resistivity of the molten salt in the first compartment was 1.18 ohm-cm., and that in the second compartment was 1.07 ohm-cm. The voltage on the middle electrode (above ground) was 298 v.; the current carried by the middle electrode was 6710 amps, and that carried by each end electrode was 3355 amps, providing a current density of 6.0 amps/in.$^2$ on each electrode surface facing the interelectrode compartments. The maximum power input was 2000 kilowatts, resulting in a maximum power density (in the molten salt bath in the evaporator) of 22.4 kw./ft.$^3$.

In its broader aspects, the invention is applicable to other liquids, especially other molten salt mixtures from which a constituent salt, e.g. an aluminum halide, is to be evaporated. It is apparent that the protection afforded by the invention against short-circuiting to connected metal conduits or like structures may also be important where such conduit has a lining, in the sense that there would then be no concern about electrical leakage by reason of cracks in or deterioration of the conduit lining.

It is to be understood that the invention is not limited to the specific procedures and embodiments hereinabove set forth, but may be carried out in other ways without departure from its spirit.

I claim:

1. Apparatus for passing an electric current through a liquid, comprising, in combination, structure defining an electrically insulated treating region; metal inlet and outlet conduits communicating with said treating region, for advancing liquid though said region along a path of flow extending between said conduits; a source of alternating electric current having a grounded terminal and at least one ungrounded terminal; and a plurality of electrodes disposed in said region in spaced relation to each other along said path of flow to effect passage of alternating electric current through said liquid in said region in a direction coaxial with said path of flow, said electrodes including first and second grounded electrodes respectively positioned adjacent said inlet and outlet conduits, and at least one other electrode positioned intermediate said first and second electrodes and connected to said one ungrounded terminal of said current source.

2. Apparatus for passing an electric current through a liquid, comprising, in combination, a metal shell defining a treating region and having an internal lining electrically insulating said shell from said region; metal inlet and outlet conduits connected to said shell and communicating with said treating region, for advancing liquid through said region along a path of flow extending between said conduits; a source of alternating electric current having a grounded terminal and at least one ungrounded terminal; and a plurality of electrodes disposed in said region in spaced relation to each other along said path of flow to effect passage of electric current through said liquid in said region in a direction coaxial with said path of flow, said electrodes including first and second grounded electrodes respectively positioned adjacent said inlet and outlet conduits, and at least one other electrode positioned intermediate said first and second electrodes and connected to said one ungrounded terminal of said current source.

3. Apparatus for passing an electric current through a liquid, comprising, in combination, a metal shell defining a treating region and having an internal lining electrically insulating said shell from said region; metal inlet and outlet conduits connected to said shell and communicating with said treating region, for advancing liquid through said region along a path of flow extending between said conduits; a source of alternating electric current having a grounded terminal and an ungrounded terminal; first and second grounded electrodes, disposed in said region in spaced relation to each other and respectively positioned adjacent said inlet and outlet conduits; and a third electrode, connected to said ungrounded terminal of said current source and positioned in the path of flow in said region intermediate and in spaced relation to said first and second electrodes to effect passage of alternating electric current through said liquid in said region between said electrodes in a direction coaxial with said path of flow.

4. Apparatus as defined in claim 3, wherein said third electrode is disposed, in relation to said first and second electrodes, to provide a current path through said liquid between said third and first electrodes which is substantially equal in resistance to the current path through said liquid between said second and third electrodes.

5. Apparatus as defined in claim 6, wherein said third and fourth electrodes are positioned, in relation to each other and to said first and second electrodes, to provide current paths through said liquid between said first and third electrodes, said third and fourth electrodes, and said fourth and second electrodes which are substantially equal to each other in resistance.

6. Apparatus for passing an electric current through a liquid, comprising, in combination, a metal shell defining a treating region and having an internal lining electrically insulating said shell from said region; metal inlet and outlet conduits connected to said shell and communicating with said treating region, for advancing a liquid through said region along a path of flow extending between said conduits; a source of three-phase alternating electric current having a grounded terminal and two ungrounded terminals; first and second grounded electrodes, disposed in said region in spaced relation to each other along said path of flow and respectively positioned adjacent said inlet and outlet conduits; and third and fourth electrodes respectively connected to said two ungrounded terminals of said current source and positioned in said region intermediate said first and second electrodes in spaced relation to said first and second electrodes and to each other along said path of flow, to effect passage of electric current through said liquid in said region between said electrodes in a direction coaxial with said path of flow.

7. Apparatus for heating a liquid, comprising, in combination, a metal shell defining a heating region and having an internal refractory lining electrically insulating said shell from said region; metal inlet and outlet conduits connected to said shell and communicating with said heating region, for advancing liquid through said region along an extended path of flow between said conduits; a source of alternating electric current having a grounded terminal and at least one ungrounded terminal; and a plurality of electrodes, each comprising a planar metal plate perpendicularly intersecting said path of flow in said region, disposed in spaced relation to each other along said path of flow to effect passage of electric current through said liquid in said region in a direction coaxial with said path of flow said electrodes including first and second grounded electrodes respectively positioned adjacent said inlet and outlet conduits, and at least one other electrode positioned intermediate said first and second electrodes and connected to said one ungrounded terminal of said current source.

8. Apparatus for heating a molten salt mixture to volatilize a constituent thereof, comprising, in combination, a metal shell defining a horizontally elongated confined heating chamber and having an internal refractory lining electrically insulating said shell from said chamber; metal inlet and outlet conduits connected to said shell and respectively communicating with opposite ends of said chamber for advancing molten salt through said chamber along a path of flow extending longitudinally through said chamber; means for withdrawing gas from said chamber; a source of single phase alternating electric current having a grounded terminal and an ungrounded terminal; and a plurality of electrodes, each comprising a planar metal plate suspended from said shell and perpendicularly intersecting said path of flow in said chamber, disposed in spaced relation to each other along said path of flow to effect passage of electric current through said molten salt in said chamber in a direction coaxial with said path of flow, said electrodes including first and second grounded electrodes respectively positioned adjacent said inlet and outlet conduits, and a third electrode positioned intermediate said first and second electrodes and connected to said ungrounded terminal of said current source.

References Cited
UNITED STATES PATENTS

| | | | |
|---|---|---|---|
| 1,267,317 | 5/1918 | Erskine | 13—6 |
| 1,594,496 | 8/1926 | Clark | 13—6 |
| 2,599,779 | 6/1952 | Rajtora | 13—23 |
| 2,698,777 | 1/1955 | Hartwick et al. | 13—23 X |
| 2,850,610 | 9/1958 | Kasuga | 219—332 X |
| 2,984,829 | 5/1961 | Ausburger | 340—255 |
| 3,235,376 | 2/1966 | Hollingshead | 75—68 |

FOREIGN PATENTS

| | | |
|---|---|---|
| 216,538 | 1/1942 | Switzerland. |

ANTHONY BARTIS, *Primary Examiner.*

V. Y. MAYEWSKY, *Assistant Examiner.*